United States Patent [19]

Konig et al.

[11] 4,049,922
[45] Sept. 20, 1977

[54] SWITCHING ARRANGEMENT FOR TELECOMMUNICATION SWITCHING SYSTEMS

[75] Inventors: Justus König, Munich; Josef Röhrig, Oberhaching; Friedrich Hilliges, Eichenau, all of Germany

[73] Assignee: Siemens Aktiengesellschaft, Munich, Germany

[21] Appl. No.: 668,955

[22] Filed: Mar. 22, 1976

[30] Foreign Application Priority Data

Mar. 21, 1975 Germany .............................. 2512551
Dec. 11, 1975 Germany .............................. 2555860

[51] Int. Cl.² .......................................... H04M 3/22
[52] U.S. Cl. ................................................ 179/18 AB
[58] Field of Search ......... 179/18 AB, 16 F, 175.2 R, 179/175.2 C, 175.21

[56] References Cited

U.S. PATENT DOCUMENTS 3,601,560  8/1971  Garrett et al. ................. 179/18 AB

FOREIGN PATENT DOCUMENTS 1,173,538  7/1964  Germany ..................... 179/18 AB
1,221,686  7/1966  Germany ..................... 179/18 AB Primary Examiner—Thomas A. Robinson
Attorney, Agent, or Firm—Schuyler, Birch, Swindler, McKie & Beckett

[57] ABSTRACT

A telecommunication switching arrangement is described wherein those switching elements that are idle are marked at a given test point with a free or idle potential, and those which are currently in use, or busy, are marked by an absence of the foregoing potential. The condition indicated at the test point is sensed by test switches on a preceding switching element which, using a test and seizing circuit, attempts to seize the switching element in question. When a switching element is busy, it is guarded by a potential differing from the idle potential. In the course of a connection release and while an inhibited test and seizure circuit is opened, seizure attempts on the opening seizure circuit are prevented. A current monitoring device recognizes a decrease in current flow as a release and opens the seizing circuit until the switching element in question is completely released.

4 Claims, 1 Drawing Figure

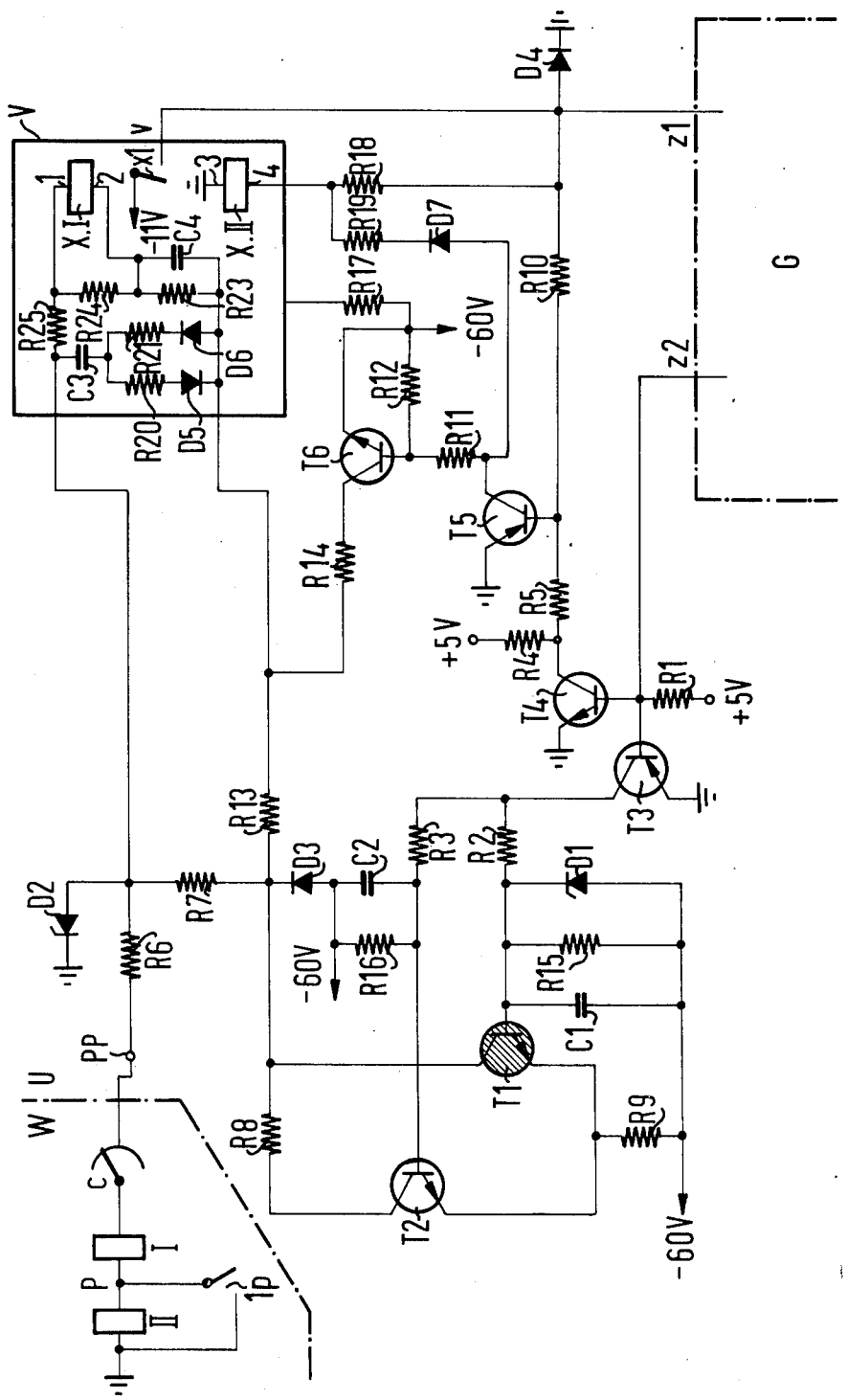

SWITCHING ARRANGEMENT FOR TELECOMMUNICATION SWITCHING SYSTEMS

BACKGROUND OF THE INVENTION

The invention relates to a switching arrangement for telecommunication switching systems, more particularly telephone switching systems. The invention is particularly directed to apparatus wherein the idle condition of switching elements ready to be seized by the traffic carried is marked at a test point by a potential applied to the test point over resistances of a seizing circuit of the switching element involved, and the blocked condition is indicated by the absence of that potential, or vice versa.

This type of switching arrangements has become known in the art, for example, through West German Auslegeschrift No. 1 940 847. A widely known technique in automatic telephone systems is to determine through test relays the busy/idle condition of seizing wires connected to switches, repeaters and similar switching facilities. There test relays first test the switching device by connecting it to a comparatively high impedance and, if it is in the idle condition, seize and guard it against seizure by connecting it to a low impedance. In the idle condition the tested switching device offers a potential, e.g., a negative potential, that indicates this condition via its seizing circuit at a test point allocated thereto.

A testing switch operates from its test circuit with a reverse potential, e.g., a positive potential (ground potential). When a switch finds an idle output, i.e., when a test circuit of a testing switch is connected to a seizing circuit of a following idle device, whose test point carries the potential indicating the idle condition, the test relay of the switch operates. It connects the reverse potential to the test point of the seizing circuit of the device so seized reducing the resistance of the circuit, that is, it rejects the potential indicating the idle condition. The test relay of the switch is held via the thusly closed circuit. Other switches tested thereafter find almost the reverse potential (strictly speaking, a partial voltage) on the seizing circuit, thus recognizing the relevant device as busy.

Consequently, when a busy device is being tested, there exists a branched circuit. The common part of this divided circuit comprises the seizing circuit of the busy device. One of the two branches of the divided circuit comprises a rejection filter of the switch that has previously seized the succeeding device. The low impedance winding of the test relay of this switch is disposed in this branch. The other of the two branches is the test circuit of the other switch which finds the following device inhibited (busy). In this branch the low impedance and the high impedance windings of the test relay of the second switch are connected in series. The branching point is the test point of the seizing circuit of the following device.

Because the rejection circuit of the first switch is of substantially lower impedance than the test circuit of the second switch, one obtains a branch circuit at the common test point, the splitting of the total current in the seizing circuit of the following device into two partial currents being such that by far the predominant part of the total current flows through the rejection circuit and the test relay of the first switch which thus was the first to attempt to seize the succeeding device.

The partial current in the test circuit of the second switch and its two test relay windings is so weak as to make the test relay unresponsive. Thus, it is ensured that the test relay of the first switch remains operated and the test relay of the second switch cannot operate.

A more difficult situation develops in the special case where two switches are tested in parallel. In this case, the two circuits of two switches tested independently of one another are randomly and simultaneously connected to the test point of a following device. Assuming that the test relays of both switches have the same resistances, which may reasonably be expected, the current is subdivided in the ratio of 1:1, i.e., half the current in the seizing circuit of the following device flows in the windings of the test relays of both switches. In this case, both test relays must not operate. This condition is hard to comply with. Therefore, the low impedance guarding by the test relay which is the first to operate its contacts prevents the other test relay from operating also.

To improve the above conditions for preventing dual testing when two switches are tested in parallel, two test relays per switch have been provided in known switching arrangements (e.g., West German Pat. Nos. 1 013 701 and 1 165 678), of which a first high-speed test relay for stopping the switch energizes a second test relay (auxiliary test relay). The second test relay serves to improve the certainty of preventing the dual testing of two switches being tested in parallel.

West German Auslegeschrift No. 1 940 847 discloses a technique for increasing the resistance of seizing circuits after seizure. The same publication also discloses a technique for connecting reverse potential to its own seizing circuit over its own resistor, not only from a testing and guarding switch, but also inside a device seized by a preceding switch. This principle is reduced to practice, among other things, through the use of an opposing winding of the seizing relay which is provided in lieu of the resistor mentioned above. This opposed winding is so designed that the seizing relay receives adequate holding energization even after it has been actuated. As the preceding switch is released, the current in the opposed winding increases so that the seizing relay is rejected through opposing energization. Energization of the resistor or the opposing winding decreases the current in the test circuit of the guard switch, but not in the seizing circuit. The potential at the test point of the device involved is moved toward the reverse potential.

The increase in resistance referred to hereinabove and effected by looping an additional resistor into the seizing circuit and the subsequently described connection of reverse potential inside a device seized by a preceding switch via an additional resistor or via an opposed winding of the seizing relay are designed both to increase the reliability of guarding inhibited seizing circuits and to prevent a seizure attempt on releasing connections. A seizure attempt here refers to an operation wherein as a preceding switch is released, prior to the release of the seizing relay of the switching device seized until then and guarded by it and becoming idle as a result of the release, another switch tests or seeks to seize the switching device before the seizing relay has released. Due to partial energization on a previous step of the switch the test relay of a switch, owing to a parallel process or the like, is capable of operating fully on the next step even on a potential normally inadequate for seizure attempts. However, by increasing the resistance, this effect can be prevented by the use of the test circuits described in West German Pat. Nos. 1 013 701 and 1 165 678.

These aforementioned test circuits require one test relay and one auxiliary test relay per switch. In the case of switches having only a single test relay, i.e., not provided with a test circuit as disclosed in West German Pat. Nos. 1 013 701 and 1 165 678, seizure attempts cannot be prevented by connecting, as described hereinabove, the reverse potentials inside a device seized by a preceding switch to its own seizing circuit of the seized device over its own resistor or over an opposed winding of the seizing relay.

Accordingly, it is an object of the invention to guard seizing circuits of switching devices ready to be seized by preceding switches or the like, not only against the hazards of dual testing when two switches are tested in parallel, but also against the hazards of seizure or reseizure attempts.

SUMMARY OF THE INVENTION

The foregoing and other objects of the invention are achieved in a circuit arrangement wherein a current monitoring device provided in the seizing circuit recognizes a decrease of the current flowing during the cut-off as a release and opens the seizing circuit until the switching element involved has fully released. Thus, according to the principles of the invention all "non-operate" current conditions are fully avoided. For a relay, "non-operate" current means that a current flows through its winding of windings to which it will not respond in any way.

A seizure attempt on releasing connections is likewise ruled out where, at the moment when a first switch which until then guards a seizing circuit, opens the test and seizing circuit, a second switch on the same seizing circuit has already commenced its testing process. In this special case, there is no interruption of current in the seizing circuit concerned, but merely a decrease of current to a value throughout a testing process during the operate time of the test relay. Thus, although in such a case the switch involved is not capable of recognizing an unwanted seizure attempt, the seizing circuit of the invention guards against this. To recognize this special condition, the circuit arrangement of the invention does not require a brief interruption of current in the seizing circuit but evaluates the decrease of current from a current value corresponding to the blocking state to one in the seizing circuit corresponding to the testing state.

BRIEF DESCRIPTION OF THE DRAWING

The principles of the invention will be moe readily understood by reference to the description of a preferred embodiment given hereinbelow in conjunction with the accompanying single FIGURE drawing which is a schematic drawing of the switching arrangement constructed according to the invention.

DETAILED DESCRIPTION OF THE DRAWING

In the FIGURE a test circuit of a switch W and the two windings I and II of a test relay P are illustrated. Winding II of the test relay may be short-circuited over a contact 1p allocated to the relay. The test circuit of switch W may be connected by a test wiper c in a known manner to test points PP of succeeding, ready for seizure switching device U. These switching devices U may, for instance, be connector sets, such as internal junctors, trunk repeaters, (line) terminating circuits of long-distance lines and the like. The switching devices U number among the "switching devices required for each connection", i.e., devices allocated individually to a connection throughout its existence, e.g., selectors, interexchange trunks, links in switching networks and the like.

Various seizable switching devices U are combined into a group, to which a common connector set control G (buffer storage) as described in West German Pat. No. 2 055 745 is allocated. Signals are sent between each of the switching devices U and the common control G over circuits $z1$ and $z2$. Each of the switching devices U indicates the signal condition of the seizure to the common control G over circuit $z1$. The common control G signals over circuit $z2$ to each of thhe switching devices U the switching instruction "connect to high impedance" at least 40 milliseconds after seizure, "block" against renewed seizure when the switching device U concerned is in the idle condition and shall not be seized momentarily.

In the idle condition of the switching device U, a negative potential is applied to the base of transistor T3 from the common control G through series resistors (not shown) and by circuit $z2$ if the switching device U is not to be ready for seizure. A 5V positive potential across the resistance R1 is made ineffective by the negative potential applied from the common control G. When the switching device U is ready for seizure in the idle condition, the transistor T3 is conductive. Ground potential is applied to the bases of transistors T1 and T2 over resistances R2 and R3. A comparatively weak quiescent current flows over the emitter-base path of each of the two transistors. As a result, the two transistors are prepared for switching a test and seizing circuit.

In the idle condition of the switching device U, transistor T4 is turned off by a negative potential applied from the common control G when the switching equipment U is ready for seizure.

In this circuit condition, transistor T5 is likewise turned off by the 5V positive potential applied to its base over resistors R4 and R5. Since in the idle condition an equal potential ($-60V$ potential) is applied to the base and the emitter of transistor T6, this transistor, too, is non-conductive in the idle condition.

When switch W is in the course of a hunting process, its test relay P is connected by test wiper c to test point PP of switching device U; a test and seizing circuit is completed extending over windings I and II of test relay P, resistors R6, R7 and R9 and over the parallel connection of both transistors T1 and T2, another resistor R8 being connected in series with transistor T2. The voltage drop across resistor R7 is recognized by a comparator V which changes a $+1V$ output signal heretofore emitted over its output $v$ to a $-11V$ output signal. In this way, the seizure taking place is signalled to common control G by circuit $z1$. Comparator V reacts to the voltage drop across resistor R7 with a delay sufficiently long to ignore brief noise pulses. To achieve this, an RC network comprising resistor R20 and capacitor C3 is provided in comparator V. In case of a seizure attempt, diode D5 is conductive while capacitor C3 is charged to the voltage drop across resistor R7. Further details of comparator V will be described hereinbelow.

A circuit is also closed by the $-11V$ output signal emitted from comparator V from its output $v$ via resistors R10, R5 and R4. This is in preparation for the conductive connection of transistor T5, which will be described hereinbelow. However, initially transistor T5 still remains non-conductive, because a partial potential which is still positive relative to ground potential is still supplied at the junction point between resistors R5 and R10.

Comparator V comprises, inter alia, a relay X having two windings I and II and connecting with its contact x1 the above mentioned output signal (which is negative (−11V) relative to ground potential) to comparator output v at the specified time. Winding I of the relay is quite sensitive and has a high plate resistance. Relay X serves as a threshold switch which, upon exceeding a given voltage value (also referred to as "threshold") closes its output circuit v at winding terminals 1 and 2 over contact x1. Relay X, which serves as a threshold switch, may be designed as an electromechanical relay, but is preferably constructed as an electronic switch with an extremely short switching time, e.g., as an operational amplifier in a comparator circuit (cf. U.S. Pat. No. 3,903,405).

Threshold circuit X is connected with the terminals of its windings I to the terminals of resistor R24. Threshold switch X thus lacks the voltage applied at the terminals of resistor R24. In the test circuit extending between both input terminals of comparator V, resistor R24 is connected in series with a differentiating element comprising resistor R23 and capacitor C4. When the test and seizing circuit is closed by wiper c of switch W, the circuit extending, inter alia, over resistors R6, R7, R8 and R9 is completed. The voltage drop across resistor R7 is imparted over resistor R13 to resistor R24 in the comparator. The voltage drop across the latter is, in turn, communicated to threshold switch X which, as described earlier, closes its contact x1. Initially, the voltage across resistor R24 increases to a value higher than the upper limit, i.e., until capacitor C4 in the test circuit extending, inter alia, over resistors R13 and R24 is given a voltage value corresponding to a voltage drop across resistor R23. The particular significance of the differentiating element comprising capacitor C4 and resistor R23 will be detailed hereinbelow.

The −11V output signal applied by output v of comparator V is, inter alia, also imparted by resistor R18 to winding II of the threshold switch which is in this case a relay. In this way, an additional hold potential is applied to threshold switch X when it has reacted in the manner described above due to the closing of its contact x1 after the test and seizing circuit has been completed. The measure serves to immunize comparator V with its threshold switch X against voltage variations of the power supply and against interference voltages. Furthermore, an unwanted oscillation of the threshold switch at the moment it picks up during the test process is definitely prevented. This is especially true if threshold switch X is designed as an electronic switch.

Test relay P of the switch operates in the test and seizing circuit extending through test point PP. It closes its contact 1p, thereby short-circuiting its high-impedance winding II. It remains energized over winding I. Ground potential is now applied by a relatively low impedance connection at test point PP of switching device U across its contact 1p and winding I. In this way, other switches are prevented from attempting to seize in a hunting process the busy switching device U, which is already guarded due to the response of test relay P. The current rise caused further by the response of test relay P, inter alia, in resistor R7 results in an increase of the voltage drop which, however, does not affect comparator V.

About 40 milliseconds after comparator V has signalled over its output v and circuit z1 the input-side seizure of switching device U to common control G, the latter disconnects the negative potential heretofore turned on over circuit z2. The +5V positive potential is now capable of passing through resistor R1, thereby turning off transistor T3. As a result, transistors T1 and T2, too, become non-conductive. However, due to the 5V potential, transistor T4 is turned on and applies ground potential to the junction point between resistors R4 and R5. As a result, a negative partial potential is applied to the junction point between resistors R5 and R10 through which transistor T5 is energized. This energizes the voltage divider comprising resistors R11 and R12 and at the center of which a negative partial potential arises through which T6 is turned on. The seizing circuit extending over transistors T1 and T2 now no longer extends over the transistors, but over resistors R13 and R14. Capacitors C1 and C2 ensure that during the processes last described transistors T1 and T2 are turned off with a certain delay after transistor T3, so that the seizing circuit described above and extending over resistor R9 is not opened until the seizing and holding circuit has been switched through over resistors R13 and R14 by means of transistor T6. This ensures that the test and seizing circuit extending through test point P will not be broken.

Due to this switchover of the test and seizing circuit extending through test point PP from its section extending over transistors T1 and T2 to the section extending over transistor T6, the overall resistance between test point PP and the negative potential is increased. As a result of this switching process also known as "connection to high impedance" of the seizing circuit, the reliability of guarding switching device U is increased, that is, the reliability that no other switch can attempt to seize the busy and guarded seizing circuit of switching device U.

Due to the above mentioned switchover of the seizing circuit from its course over resistor R9 to its course over resistors R13 and R14, the voltage drop applied to comparator V is further increased, thereby guarding the test and seizing circuit against interferences by induced or capacitively transferred extraneous voltages throughout the duration of the switched connection corresponding thereto. Furthermore, the reliability of guarding against dual testing is increased, and the current consumption reduced.

When the test and seizing circuit is opened from the preceding switching, that is, when the corresponding connection is released, the resistors R7 and R13 become de-energized. The voltage drop existing until then no longer exists. Comparator V again disconnects the −11V signal emitted until then over its output v, and instead, applies the +1V potential mentioned earlier, thereby signalling over circuit z1 to common control G that switching device U has been released from the preceding switch. Common control G now initiates in a manner, not described in detail herein, the release of all the remaining parts of switching device U. The common control momentarily does not turn on the negative potential over circuit z2. The reaction time of comparator V in respect of the connection release is slightly and artificially extended by means of the RC network comprising resistor R21 and capacitor C3 so as to guard comparator V and its threshold switch X against interference voltage which can be induced in the test and seizing circuit in a known manner. By means of this RC network, comparator V receives a clearly defined reaction time in respect of the release process.

As a result of the change of the output signal by comparator V from −11V to +1V, transistor T5 is again turned off and thus also transistor T6. When a switch attempts to seize the switching device U, which is still in the circuit condition of incomplete release, it will find the −60V potential indicating the idle condition neither over transistors t1 and T2 nor over transistor T6. Thus, switching device U is momentarily guarded against renewed seizure.

Accordingly, as described hereinabove, with the release, that is, with the opening of the test and seizing circuit, comparator V again connects to its output v a positive potential of about 1V instead of the −11V negative potential. However, comparator V reacts to the disappearance of the voltage drop across resistors R7 and R13 with a certain delay, thereby ensuring that a false release cannot be brought about, for example, by noise pulses that may be transferred inductively or capacitively to the test and seizing circuit being in the blocking state.

With regard to the problem of testing for releasing connections, it may happen that a testing switch connects its test relay by its test wiper to the test point of a switching device seized and guarded by another switch, and that immediately thereafter, the switch connected until then to and guarding the switching device is released and opens the test and seizing circuit existing until then and which is in the blocking state. In such a case there is in conventional switching centers the possibility that the test relay of the testing switch operates, resulting in a false connection. Appropriate measures are provided to prevent this possibility. Four different possibilities exist for this, which will be described hereinbelow.

One of the four possiblities involves the use of the differentiating element mentioned earlier and comprising resistor R23 and capacitor C4 with a view to preventing the above mentioned seizure attempt on the seizing circuit of a device U currently in the release stage ("a seizure attempt on releasing connections"). In the case of such an unwanted test process it is worth noting that the test and seizing circuit that exists initially and is in the blocking state contains only winding I of the test relay of the guarding switch W concerned, but that this test and seizing circuit of the testing switch, which continues to exist as the test and seizing circuit currently in the blocking state is opened, also contains the higher impedance winding II of test relay P in addition to the low impedance winding I. Thus, in this particular condition the release of the first connection cannot be recognized from an opening of the test and seizing circuit, that is, not from a complete vanishing of the voltage drop across resistors R7 and R13, but from a decrease of current through them. The voltage drop becomes effective on the input side across the comparator in this particular condition after the decrease of current occurs across resistors R7 and R13. Thus it is even greater than the voltage drop effective across the comparator during the standard test and seizing process prior to the response of the test relay involved, because this voltage drop arises only across resistor R7.

In order to be able to distinguish this particular condition (seizure attempt on releasing connection) from a standard test and seizing process with a switching device U currently in the idle condition, a differentiating element comprising resistor R23 and capacitor C4 is provided in the first of the four possibilities. In the above mentioned decrease of current in the hold circuit extending over resistors R6, R7, R13 and R14 the voltage drop across resistors R7 and R13 is reduced; thus, the input voltage of comparator V is diminished. Since in this case capacitor C4 shall be discharged by a partial amount corresponding to the reduction of the input potential of comparator V, the potential across resistors R23 consequently falls off gradually at first, but the potential across resistor R24 at the time of the decrease of current in the seizing circuit must first fall off to a magnitude which is the difference between the voltage drop across resistors R7 and R13 after the current decrease and the capacitor potential across capacitor C4 prior thereto.

By means of a differentiating element comprising resistor R23 and capacitor C4, comparator V is capable of recognizing a decrease of current in the seizing circuit in the event a switch attempts to seize the seizing circuit of a connection device in the release stage and in this way preventing an unwanted testing. With such a decrease of current the threshold switch X reacts in such a way that it opens its contact x1. Thus, the circuit extending over resistors R6, R7, R13 and R14 and over transistor T6 is opened in the manner described above. The threshold level of threshold switch X is adjusted such that it opens its contact when the voltage across resistor R24 assumes a value which is the difference between the voltage drop across resistors R7 and R13 after the decrease of current and the capacitor voltage across capacitor C4 prior thereto.

In the second of the four possibilities mentioned hereinabove, a provision is made for connecting the collector of transistor T5 with a resistor R19 to the upper terminal of resistor R18. Thus, the extra hold potential applied over resistor R18 to winding II of threshold switch X is again rejected in part when transistor T5 reacting during the increase of resistance detailed hereinabove becomes conductive and ground potential is fed to its collector. This ground potential reaches through across resistor R19 to resistor R18, thereby reducing the current in winding II of threshold switch X. After the increase of resistance, the circuit energized over resistor R19 by means of transistor T5 serves to artificially reduce the total energization fed to threshold switch X over its two windings. This enables threshold switch X to recognize a decrease of current in resistors R7 and R13 in the event of a seizure attempt on the seizing circuit of a connection device U currently in the release stage. In this context, too; it is worthy of note that the test and seizing circuit existing initially and currently in the blocking state contains only the winding I of the test relay of the guarding switching W. The test and seizure circuit of the testing switch, which continues to exist as the test and seizing circuit currently in the blocking state is opened, also contains the higher impedance winding II of test relay P in addition to the low impedance winding I. Hence, in this particular condition the release of the first connection cannot be recognized from an opening of the test and seizing circuit, that is, not from a complete absence of the voltage drop across resistors R7 and R13. It is recognized from a decrease of the voltage drop across said two resistors. The voltage drop effective on the input side across the comparator is in this particular condition after the decrease of current occurs across resistors R7 and R13. Thus, it is even greater than the voltage drop effective across the comparator during standard test and seizing process prior to the response of the test relay involved, because said voltage drop arises only across resistor R7. In order to be able to distinguish this particular condition (seizure attempt on releasing connection) from a standard test and seizing process with a switching device U current in the idle condition, the total energization of the threshold switch X in the comparator V is artificially reduced in that the ground potential reaches through to the hold circuit completed over transistor T5, diode D7 and resistor R19, resulting in the reduction of the magnitude of the current in winding II.

The third possibility of recognizing with certainty a decrease of current in resistors R7 and R13 after the increase of resistance, that is, when not only the voltage drop across resistor R7 is applied to comparator V but the voltage drop across resistors R7 and R13, consists in ensuring that when proportioning the resistance values of resistors R6, R7, R13 and R14, the resistance values of the two windings of test relay P are considered. The voltage drop across resistor R7 when switch W attempts to seize is of sufficient magnitude to cause threshold switch X of comparator V to operate. The voltage drop across resistors R7 and R13 after the increase of resistance is of sufficient magnitude to "hold" threshold switch X of comparator V, to prevent it from returning to its rest position and reopening its contact $x1$. Further, the voltage drop across resistors R7 and R13 in the unwanted instance of a seizure attempt on the seizing circuit of a device U currently in the release stage is less than the threshold value governing the resetting (i.e., the release, whereby contact $x1$ is opened) of threshold switch X of comparator V. The voltage drop in question is less than in the circuit condition after increasing the resistance of the holding branch of the seizing circuit due to the inclusion of winding II of test relay P of the switch W.

The fourth possibility of recognizing with certainty a decrease of current in resistors R7 and R13 after the increase of resistance consists proportioning the threshold value of threshold switch X in comparator V in such a way that the threshold switch does not commence operating when the test and seizing circuit is completed over wiper $c$ of switch W, but only after test relay P picks up. Thus, with this possibility the test relay P is the first to operate after the test and seizing circuit is completed by means of wiper $c$ of switch W. It closes its contact $1p$, thereby short-circuiting its higher impedance winding II. Due to the shorting of winding II of relay P the current in the test and seizing circuit rises. With this possbility, the threshold switch X of comparator V is proportioned such that it does not operate until the current in the test and seizing circuit is increased by closing contact $1p$. When the resistance is increased, the current in the test and seizing circuit decreases again. However, since across the input of comparator V, due to the increase of resistance, not only the voltage drop across resistor R7 occurs, but the voltage drop of both resistors R7 and R13, the input voltage across the input of comparator V does not decrease when the resistance is increased. However, if the current decreases in the holding branch of the test and seizing circuit extending over resistors R6, R7, R13 and R14, the threshold switch X recognizes the unwanted instance of a seizure attempt by a switch W on the device U already in the release stage. The threshold switch opens its contact $x$ and breaks by means of transistor T6 the holding branch of the test and seizing circuit extending over resistors R6, R7, R13 and R14. In this way the unwanted seizure attempt is stopped.

The four possibilities described hereinabove for preventing seizure attempts on releasing connections may be used separately or in any desired combination.

As mentioned earlier, the seizing circuit of switching device U extends from test point PP over resistors R6, R7, R8 and R9 over transistors T1 and T2. When the resistance is increased, the portion of the seizing circuit comprising resistors R8 and R9 and transistors T1 and T2 is de-energized, and instead, a holding circuit extending over resistors R13 and R14 and over transistor T6 is energized. Worthy of note is the section of the seizing circuit comprising resistors R8 and R9 and transistors T1 and T2. This section of the seizing circuit works as a constant-current generator in conjunction with the terminal to the $-60V$ voltage source. Transistor T1 has a current-regulating function. The potential which is positive relative to the $-60V$ battery potential connected across resistor R9; the positive potential fed to the base of transistor T1 across transistor T3 is so limited by Zener diode D1 that the absolute value of the base potential of transistor T1 cannot exceed a value defined by Zener diode D1. The current flowing in the seizing circuit generates a voltage drop across resistor R9. The Zener voltage of diode D1 less the voltage drop has a controlling effect on transistor T1 and determines its base current. Thus, since the base potential across the transistor T1 which, according to the assumption shall be conductive, must be positive and remain so relative to its emitter potential, the voltage drop generated by the current in the seizing circuit in resistor R9 can only be of such magnitude that said voltage drop can at the most reach an upper limit value corresponding to the Zener voltage less the control voltage necessary for transistor T1. Hence, since the voltage drop across resistor R9 is limited, a limit is also set to the current in the seizing circuit itself, which shall not be exceeded. Hence, transistor T1 has a current-regulating effect. It simulates a resistance that can be adjusted practically between zero ohm and an infinitely large resistance.

Resistor R8 is connected in parallel with transistor T1 across transistor T2 which is conductive at a low impedance in the working condition. The control range of the constant current generator formed by transistors T1 and T2 and resistors R8 and R9 together with diode D1 is defined by the resistance value of resistor R8. By means of the resistance simulated by transistor T1, the constant current generator is thus capable of controlling the current in the test and seizing circuit within the limits set by the shorting of resistor R8 and its full effectiveness. Resistor R8 serves to convert and carry away partly outside of transistor T1, the power dissipation caused by the current carried between resistors R7 and R9. Thus, in a practical application the maximum power dissipation in transistor T1 can be reduced by a ratio of about 2 to 1 relative to the power dissipation which would occur if no resistor R8 and transistor T2 were provided.

However, it is likewise possible to eliminate transistor T2 and resistor R8. This enlarges the control range of transistor T1, but at the same time, the power to be dissipated in transistor T1 is likewise increased.

The current-controlling action of the constant-current generator will be described hereinbelow by comparing the case where single tests occur with the parallel test case. Assuming that switches testing in parallel are switches having identical test circuits, the parallel connection of both test circuits in the parallel test case, as is well known, has half the plate resistance as compared with the plate resistance of only one of said two test circuits. Thus, in the parallel test case the constant-current generator finds on the other side of test point PP of switching device U only half the resistance as in the single test case. However, it sees to it that in both cases only the same current flows in the seizing circuit of switching device U. This ensures that in the parallel test case only half as much current flows in a test relay of a switching as in the single test case. In this way the parallel test case is more clearly discernible for the test relays of the switches concerned as compared with the single test case and better protection is afforded against dual testing in the parallel test case.

In this connection it is also worth noting that test and seizing circuits each run along one of the wires of an interexchange trunk, which may have different lengths and, therefore, may introduce additional line resistances of different magnitudes in the respective seizing circuit of a switching device U. The line resistance of an interexchange trunk must be inserted between resistor R6 of switching device U and its test point PP. In addition, the constant-current generator serves to balance the line resistance of the seizing circuits being used which varies from trunk to trunk. Furthermore, the constant-current generator offers excellent protection against short-to-ground at test point PP of switching device U. In the event of such a short-circuit the constant-current generator prevents an overload of the resistors (R6 and R7) carrying the short-circuit current.

In addition to the function described hereinabove of delaying the de-energization of the seizing circuit extending across resistor R9 when the resistance is increased, capacitors C1 and C2 also serve to ensure a delayed current rise in the test and seizing circuit at the start of a test and seizing process. As is known, test relays use seizing relays in seizing circuits accessible to them whose windings have a complex resistance which, at the start of each test and seizing process, causes a delayed current rise. To achieve a minimum operate time of the test relay being used, the seizing relays carry a secondary winding which is normally in the idle condition. This causes the current in a closed test and seizing circuit to rise more steeply than if the shorted secondary winding were not provided. In this way a comparatively short operate time is achieved for the test relays. As is known, test relays are used in motorswitch circuits operating at exceedingly high speeds in comparison with other known electromechanical relays. The test relays thus have a particularly high sensitivity. They are so designed that they are capable of causing the motor to stop, although their operate circuit runs along a winding of an electromagnetic seizing relay in the seizing circuit of a following switching device ready for seizure and although said seizing relay, in spite of its shorted secondary winding owing to the remaining inductivity, results in a current rise which is delayed circuit. Now, if such highly sensitive and high-speed test relays of motor-switches would attempt to seize purely resistive seizing circuits, the speed of response would be increased still further. A consequence thereof would be contact bounces and increased wear of the contacts involved, more particularly of the contacts employed directly to stop the motor and, hence, subject to a particularly high current load.

This unwanted effect is remedied by the switching arrangement of this invention, because at the start of each test and seizing process the current rise in transistor T1 is delayed by means of capacitor C1. In idle condition there flows through transistor T3, resistor R2, the base-emitter path of transistor T1 and resistor R9 a quiescent current when the switching device U is marked from common control G as ready for seizure. Resistor R2 is of comparatively high impedance as composed with resistor R9. Thus, a comparatively slight voltage drop occurs across that resistor. Likewise, the voltage drop across the base-emitter path of transistor T1 is very slight. Thus, in idle condition capacitor C1 is charged to only about 1 volt. If a test and seizing circuit is closed, owing to the current-controlling action described hereinabove of transistor T1, only a comparatively weak current arises in the test and seizing circuit initially. Since, as described earlier, the current flowing in the seizing circuit produces a corresponding voltage drop across resistor R9, and since the voltage drop can at the most reach a value lower than the capacitor voltage and equalling the control voltage necessary for transistor T1, the voltage across capacitor C1 determines the maximum current in the seizing circuit. Capacitor C1 is now charged across resistor R2. The control potential across transistor T1 rises in accordance with the charging process and, accordingly, the current in the test and seizing circuit is increased. The charging process of capacitor C1 ends when the Zener voltage of diode D1 is reached. Thereafter, the capacitor retains the voltage. From now on the current in the seizing circuit is not increased any further. When the resistance is increased, that is, when transistor T3 and resistor R2 are de-energized, capacitor C1 is discharged over resistor R15.

Just as an RC network comprising resistor R2 and capacitor C1 is allocated to transistor T1 with a view to delaying the current rise in the emitter-collector junction, an RC network comprising resistor R3 and capacitor C2 are also assigned to transistor T2. Both RC networks have substantially the same design. Since resistor R8 is connected in series with the emitter-collector junction of transistor T2, transistor T1 determines the delayed current rise in the test and seizing circuit.

If switching device U shall be guarded in the idle condition against renewed seizure by a preceding switch, common control G takes away the negative potential applied until then in the idle condition over circuit z2. In this way transistor T3 becomes de-energized. The base-emitter junctions of transistors T1 and T2 likewise become de-energized. Hence, no preceding switch can attempt to seize switching device U, which is guarded in the idle condition. Thus, switching device U receives from common control G over one and the same circuit z2 both the signal "connect to high impedance" and the signal "guard in idle condition". These two signals emitted by common control G in the same form to switching device U are thus distinguishable from one another in the switching device in that the common control applies the negative potential supplied over circuit z2 for increasing the resistance after seizure has taken place, whereas it applies the negative potential in the idle condition for guarding the seizing circuit. Both signals are transmitted over one and the same circuit z2 to switching device U.

The principles of the invention are described hereinabove by describing the construction and operation of a preferred embodiment of a device operating according to those principles. The described embodiment is considered to be only exemplary and it can be modified or changed while remaining within the scope of the invention, as defined by the appended claims.

We claim:

1. In a telecommunication switching system wherein each switching element which is idle is so indicated by an idle potential caused to appear at a test point by a seizing circuit of the switching element and the blocked condition is indicated by the absence of said idle potential, wherein the idle or blocked states of a switching element are determined by test switches in a test and seizing circuit in a preceding switching element that attempts to seize the switching element in question and wherein guarding of a blocked switching element is effected by applying a potential differing from said idle potential to the test and seizing circuit in the preceding switching element, the improvement comprising:

means for preventing seizure attempts on a said seizing circuit in a said switching element in the course of a connection release thereof comprising:

current monitoring means in said seizing circuit for sensing a decrease in the current flowing during the blocked condition of said switching element and means responsive to an indication of a decrease in current flow from said monitoring means for opening said seizing circuit until said switching element is completely released.

2. The improved switching system defined in claim 1 wherein said current monitoring means comprises a resistance carrying the current being monitored and voltage measuring means connected across said resistance.

3. The improved switching system defined in claim 1 wherein said current monitoring means further comprises:

differentiating means for indicating changes in the current being measured as a function of time.

4. The improved switching system defined in claim 1 wherein said current monitoring means further comprises:

delay means connected to render noise pulses ineffective upon seizure and release.

* * * * *